(12) United States Patent
Stuart (10) Patent No.: US 9,436,774 B2
(45) Date of Patent: Sep. 6, 2016

(54) DYNAMIC LINKING IN SHAREPOINT (TM)

(75) Inventor: Andrew Stuart, Rydal, PA (US)

(73) Assignee: IMS HEALTH INCORPORATED, Danbury, CT (US)

(*) Notice: Subject to any disclaimer, the term of this patent is extended or adjusted under 35 U.S.C. 154(b) by 0 days.

(21) Appl. No.: 12/699,398

(22) Filed: Feb. 3, 2010

(65) Prior Publication Data
US 2010/0198866 A1   Aug. 5, 2010

Related U.S. Application Data

(60) Provisional application No. 61/149,510, filed on Feb. 3, 2009.

(51) Int. Cl.
   *G06F 17/30* (2006.01)
(52) U.S. Cl.
   CPC .................. *G06F 17/3089* (2013.01)
(58) Field of Classification Search
   USPC ..................................... 707/769, 783
   See application file for complete search history.

(56) References Cited

U.S. PATENT DOCUMENTS

| | | | |
|---|---|---|---|
| 7,117,435 B1* | 10/2006 | Kotler | G06F 17/246 715/210 |
| 2002/0143521 A1* | 10/2002 | Call | 704/1 |
| 2009/0228485 A1* | 9/2009 | Handy et al. | 707/7 |
| 2009/0249446 A1* | 10/2009 | Jenkins et al. | 726/3 |
| 2009/0259503 A1* | 10/2009 | Allen et al. | 705/7 |
| 2010/0070847 A1* | 3/2010 | Hampton et al. | 715/234 |
| 2010/0162096 A1* | 6/2010 | Morrill et al. | 715/234 |

* cited by examiner

*Primary Examiner* — Amresh Singh
(74) *Attorney, Agent, or Firm* — Maldjian Law Group LLC (57) ABSTRACT

Provided is a data management system, computer-readable medium and method including extensions to SHAREPOINT™. The system includes a computer processor operatively associated with a computer memory and one or more I/O device, in which the processor and memory are configured to operate one or more SHAREPOINT™ process. The method includes using a sequencing mechanism to allow users to navigate items stored within SHAREPOINT™. The sequencing mechanism further includes the steps of allowing a user to select a specific content type to create a link to, and allowing the user to select a specific list and or folder in which to look for items.

19 Claims, 6 Drawing Sheets

DYNAMIC LINKING IN SHAREPOINT (TM)

CROSS-REFERENCE TO RELATED APPLICATIONS

This application claims the benefit under 35 U.S.C. §119(e) of U.S. Provisional Patent Application Ser. No. 61/149,510, filed Feb. 3, 2009, entitled "RADS Dynamic Linking," the entire disclosure of which is hereby incorporated by reference.

FIELD OF THE INVENTION

This invention generally relates to extending standard MICROSOFT® SHAREPOINT™ technology with dynamic linking that enables entities deploying SHAREPOINT™ to leverage the platform not only for data storage, capture and processing, but as a true platform for enterprise applications that require multiple sets of linked data.

BACKGROUND OF THE INVENTION

MICROSOFT® SHAREPOINT™, also known as MICROSOFT® SHAREPOINT™ Products and Technologies, is a collection of products and software elements that includes a growing selection of components, web browser based collaboration functions, process management modules, search modules and a document-management platform. SHAREPOINT™ can be used to host web sites that access shared workspaces, information stores and documents, as well as host-defined applications such as blogs. Users can manipulate proprietary controls called "web parts" or interact with pieces of content such as lists and document libraries. The term "SHAREPOINT"™ can collectively refer to a number of products ranging from the base platform to various services. As used herein, the term "SHAREPOINT"™ is understood to encompass the broadest applicable meaning in terms of such components and applications, without limitation.

Standard SHAREPOINT™ functionality allows system developers the flexibility to deploy applications that can capture a variety of data with specific fields and then store that data in various buckets for further processing with workflows. See, for example, SHAREPOINT™ "Content Types," "Fields" and "Lists." Often, system developers like to use simplified data structures and eliminate unnecessary redundancy.

However, a serious limitation in SHAREPOINT™ makes it extremely difficult to link across data types and various buckets into which content may be placed.

Presently, MICROSOFT® SHAREPOINT™ provides a "Link" capability primarily using the "Lookup" field type. This field type allows an administrator to specify for a given SHAREPOINT™ field a "List" and "Display" field to which users will be able to make a selection. This Link capability is limited in several ways. For example, it will display all items to which the users have access in the list, regardless as to the underlying content type of the item. Also, the items displayed are returned from a single list, and the item that is being referenced must exist prior to selection. Additionally, the item that is being linked to has no way of referencing back to the item from which it was linked, and the mechanism for linking is a "Drop Down List Box," from which the user can select an item—if there are numerous items, the user must scroll through the entire list to find the desired item.

SUMMARY OF THE INVENTION

An aspect of the present invention provides a data management system, computer-readable medium and method including extensions to SHAREPOINT™. The system includes a computer processor operatively associated with a computer memory and one or more I/O device, in which the processor and memory are configured to operate one or more SHAREPOINT™ process. The method includes using a sequencing mechanism to allow users to navigate items stored within SHAREPOINT™. The sequencing mechanism further includes the steps of allowing a user to select a specific content type to create a link to, and allowing the user to select a specific list and or folder in which to look for items.

In one aspect of the invention, the sequencing mechanism limits the selectable lists to those that contain the specified content type, the sequencing mechanism further allows the user to elect to create an item of the specified content type in the specified list. In an aspect of the invention, the selection criteria is items created by the user.

In another aspect of the invention, the selection criteria is items created by within a specific time period. In another aspect of the invention, the selection criteria is items that match a specific query.

In another aspect of the invention, the sequencing mechanism further allows a system administrator to set filters on the content type and/or lists to be referenced.

In another aspect of the invention, the sequencing mechanism further allows a system administrator to specify queries and other criteria for restricting the items on a per filter basis.

In one aspect of the invention, the sequencing mechanism allows a system administrator to define permissions on whether new items can be created and set the permissions on the created items.

In another aspect of the invention, the sequencing mechanism further sends data to items that are referenced to allow them to link back to the item from which they are referenced.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

As already mentioned, the term "SHAREPOINT™" can collectively refer to a number of products ranging from a base platform to various services, and is used herein in its broadest applicable sense in terms of components and applications, without limitation. In particular, it is understood that the systems and methods described herein are applicable to any product or service incorporating the functionality of MICROSOFT® SHAREPOINT™, regardless of the origin of the product or service, and are thus not limited only to MICROSOFT®'s products and services.

"Dynamic linking" as presented herein refers to the extension of MICROSOFT® SHAREPOINT™ to incorporate additional critical capabilities. These include: allowing users to link from any type of content in a system to another type of content in the system "on the fly," regardless as to which list the content is stored in, creating new content elsewhere in a system from the dynamic link and automatically being referenced back to the item from which it was created, setting permissions automatically on the content that was linked to using information about the user performing the linking, and navigating between items using the links as they are, in turn, rendered as hyperlinks when displayed for rapid navigation through lists in the system.

In addition, dynamic linking allows system administrators to define restrictions on the linking. These include but are not limited to: allowing linking only to certain SHAREPOINT™ "Content Types" within certain "Lists," specifying whether the linking works only for new and or existing items, setting permissions on items that are referenced or created from links, and restricting items displayed to a combination of: a.) items created by the current user, b.) items created within a certain time period, and/or c.) items restricted by "Query" conditions.

There are some extensions to the SHAREPOINT™ capabilities that have been developed, such as allowing lookups to have "Queries" that can restrict the type and number of items returned. For example, a new field type was added called "RADS: Lookup." This extends the existing capabilities without having to redefine the way in which the underlying field control functions, e.g., it still presents as a "Drop Down List Box" and the system administrator on the field definition is simply specifying some addition criteria to limit the entries that are being returned.

"RADS" as used herein refers to a compliance platform embodiment of the inventive SHAREPOINT™ dynamic linking developed by R-Squared. It is a collection of MICROSOFT® SHAREPOINT™ Extensions that work together to create an environment in which Enterprise Applications can be configured precisely to a customer needs.

Several of the innovations for "Dynamic Linking" presented here involve a re-thinking of the process for selecting another item to create a reference to. When developers create data based applications, one of the first things they normally try to create is the data model. In order to create the data model, developers prefer to define all the types of data in the system, the underlying tables, or buckets, into which that data will be stored, and the references that exist between items.

With standard SHAREPOINT™, the tables are replaced with "Lists" and the types of data with "Content Types." However, as nothing needs to be defined ahead of time in SHAREPOINT™, there is no obvious way for laying out the references that will exist between all the items.

The mechanism used to get around this issue is to leverage the historical way in which applications are defined. This mechanism has been chosen by all other developers of SHAREPOINT™ applications. A basic data model is first created that includes a few key Content Types and Lists where references between the Content Types in various Lists are defined ahead of time using a field called a "Lookup" that creates a basic link between items and which allows on-the-fly development to take advantage of the existing basic Content Types and/or Lists.

In an embodiment of the invention, the inventive method approaches this differently in that it is determined that if the Content Types and 'Lists' are not defined ahead of time, why not allow the "references" between items to also be created on-the-fly alongside Content Types and Lists. In implementing this, it was decided to change the mechanism for creating a reference from a "Drop Down" to a "Sequencing Mechanism," e.g., a tree control, that will allow navigation of the items currently in the SHAREPOINT™ system.

The present invention advantageously provides the use of a Sequencing Mechanism and the various "Steps" within the Sequencing Mechanism to allow users to navigate items stored within SHAREPOINT™. This may include the sequencing mechanism steps of allowing a user to select a specific Content Type to which they want to create a link, and allowing the user to select a specific List and or "Folder" in which to look for items. Such Lists may be limited to those that contain the specified Content Type. The user may also create an item of the specified Content Type in the specified or selected List.

The present invention also advantageously allows a user to navigate the items using a variety of selection criteria, including but not limited to: a.) all items; b.) only items created by the current user; c.) only items created within a recent time period; and d.) Only items that match a specific query.

The present invention also advantageously allows the items returned to be further restricted using additional queries on the results. For example, items that start with letters "A through G", or Folders within the Lists.

The present invention also advantageously allows System Administrators to set filters on the Content Types or Lists that can be referenced, to specify queries and other criteria for restricting the items that are returned on a per filter basis, and to define permissions on whether new items can be created and the permissions on the items that will be created.

The present invention also advantageously provides for sending data to items that are "referenced" to allow them to link back to the item from which they are being referenced.

Figure 1:
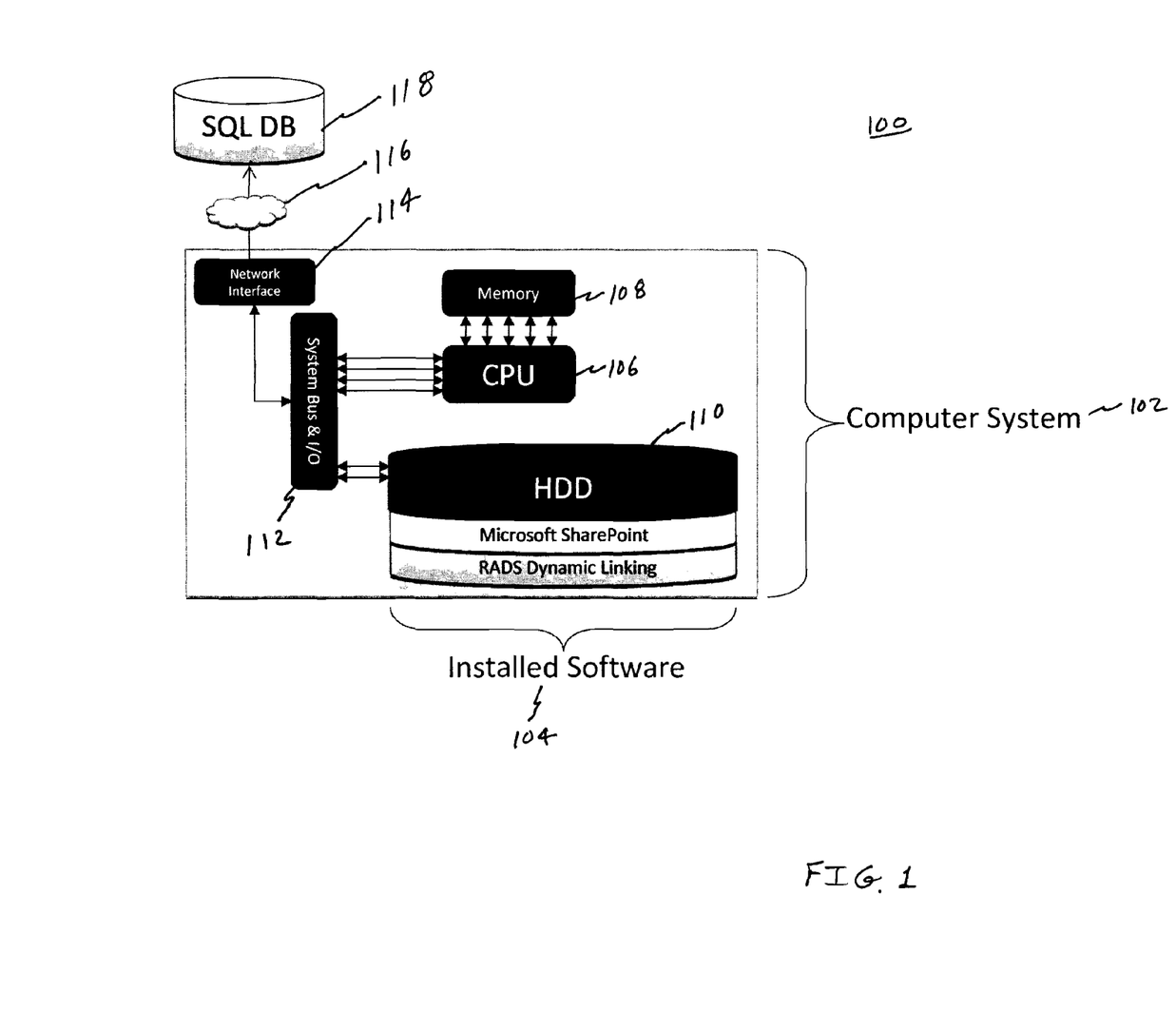
FIG. 1 is a schematic diagram illustrating an exemplary system employing dynamic linking in SHAREPOINT™, in accordance with an embodiment of the present invention.

FIG. 1 presents a system block diagram of an exemplary computer system incorporating an embodiment of the present invention. An exemplary computer system 102 includes a central processing unit 106 and associated memory 108, in communication over a system bus and with one or more I/O device 112 with a data storage device (HDD) 110 on which is installed MICROSOFT® SHAREPOINT™ and RADS Dynamic Linking software 104. In an embodiment, the system also includes a network interface 114 for communicating with an SQL database 118 over a network 116, such as the public Internet. It will be apparent to those of ordinary skill in the computer sciences that most, if not all of these components have various alternative configurations, which may be substituted without affecting the basic principles of the invention. For example, multiple central processing units with different memory arrangements may be used instead of one, with appropriate architecture and intercommunications. Likewise, a local Intranet or other network may be employed rather than the public Internet. Also, the SQL database 118 may be co-located with the computer system 102, or distributed over several locations.

Figure 2:
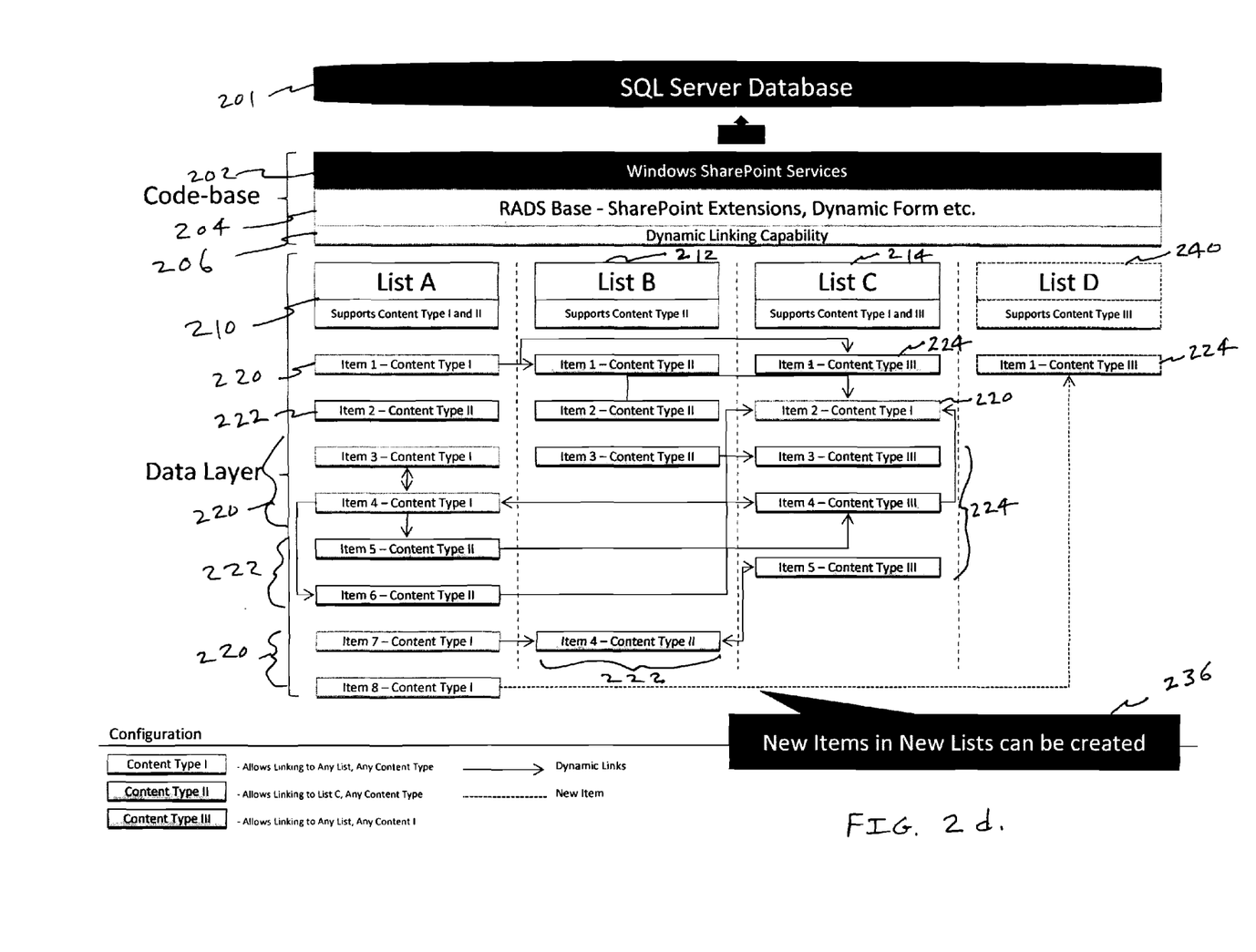
FIG. 2a is a relational database diagram of an exemplary system employing dynamic linking in SHAREPOINT™ depicting links between items, in accordance with an embodiment of the invention.
FIG. 2b is a relational database diagram of an exemplary system employing dynamic linking in SHAREPOINT™ depicting new item creation, in accordance with an embodiment of the invention.
FIG. 2c is a relational database diagram of an exemplary system employing dynamic linking in SHAREPOINT™ depicting automatic bi-directional linking, in accordance with an embodiment of the invention.
FIG. 2d is a relational database diagram of an exemplary system employing dynamic linking in SHAREPOINT™ depicting new item and new list creation, in accordance with an embodiment of the invention.
FIG. 2e is a relational database diagram of an exemplary system employing dynamic linking in SHAREPOINT™ depicting dynamic link creation, in accordance with an embodiment of the invention.

FIGS. 2a-2d are relational database diagrams depicting various features of exemplary systems employing RADS dynamic linking. Each of these embodiments includes an SQL database 201, WINDOWS SHAREPOINT SERVICES™ 202 including RADS Base with SHAREPOINT™ Extensions 204 and Dynamic Linking Capability 206. For illustrative purposes, each of these figures includes several data lists, List A 201, incorporating items having content type I and II, List B 212, incorporating items having content type II, and List C 214, incorporating items having content type I and III. FIG. 2d also includes List D 240, incorporating content type III. Items of content type I 220, content type II 222, and content type III 224 are also depicted.

Figure 2A:
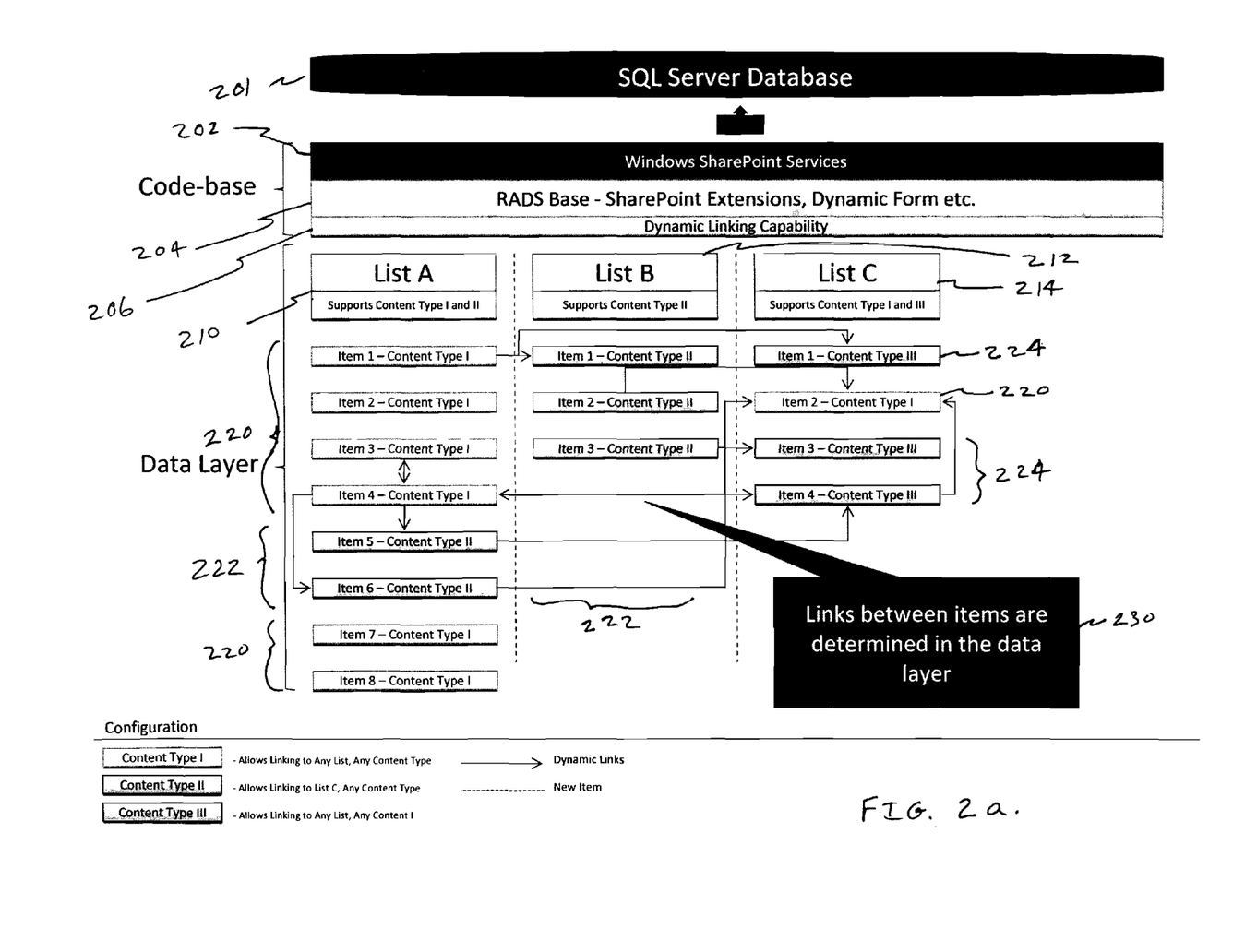

FIG. 2a demonstrates an exemplary link between items determined in the data layer 230, in an embodiment of the invention.

Figure 2B:
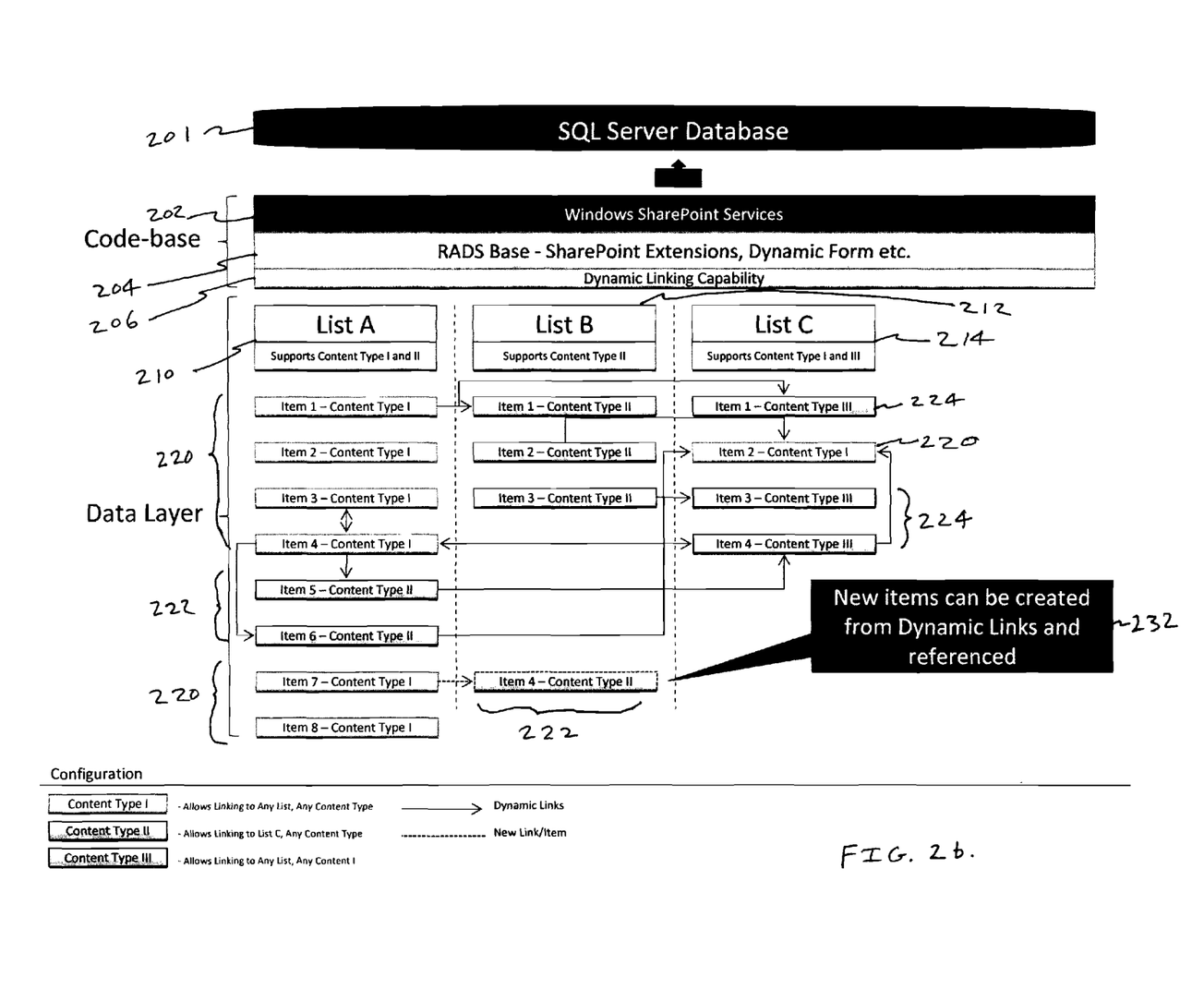

In another embodiment of the invention, FIG. 2b demonstrates that new items can be created from dynamic links and referenced 232.

Figure 2C:
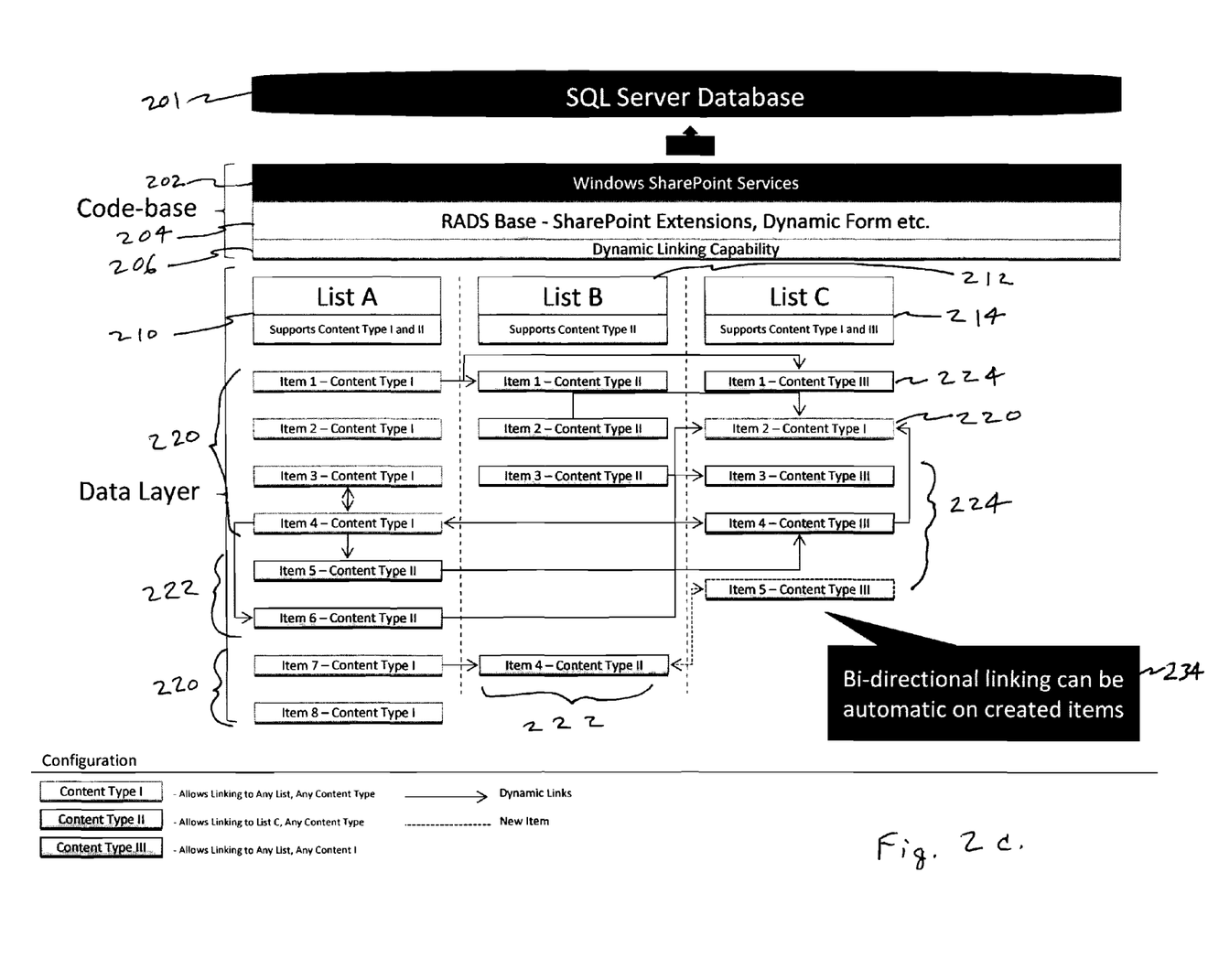

FIG. 2c demonstrates exemplary automatic bi-directional linking on created items 234, in an embodiment of the invention.

FIG. 2d depicts creating new items in new lists 236 in an embodiment of the invention.

Figure 2E:
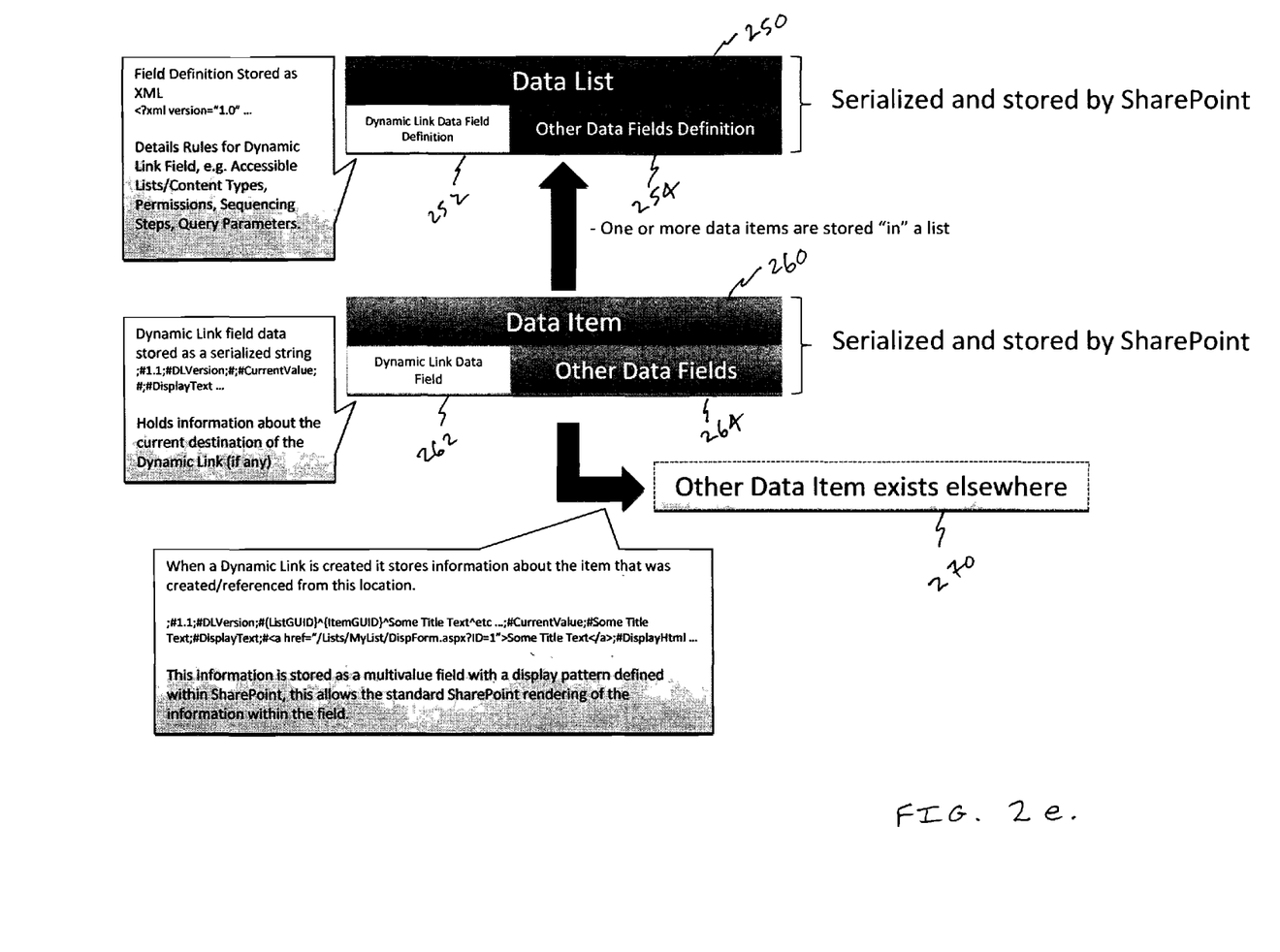

FIG. 2e diagrams a data list 250 and data item 260 in an embodiment of the invention. An exemplary data list 250 includes a dynamic link data field definition 252 and other data fields definitions 254. An exemplary data item 260 includes a dynamic link data field 262 and other data fields 264.

In an exemplary embodiment of the invention, a base class is first created that inherits from standard SHAREPOINT™ classes for defining custom fields. This base class has a custom field definition control in addition to the field control. MICROSOFT® SHAREPOINT™ Custom Properties capability is used to create additional properties on the Field type, using a meta-schema, such as XML, and both the standard properties that are used by RADS as well as specific custom fields used by the "Dynamic Link" field type are defined.

Next, information about how the fields should behave in RADS forms (using the standard RADS properties) and information about the Dynamic Link is stored. The "Standard RADS Properties" include information about dependent fields, visibility constraints, permissions on viewing the data, in addition to other information. In an embodiment of the present invention, the "Dynamic Link properties" used in the definition for a Dynamic Link field are shown in Table 1 and can be associated one-to-one with a filter or independently are determined by the implementation.

TABLE 1

| Property | Description |
| --- | --- |
| Number of inserts | This controls how many Dynamic Links can be inserted within a particular field, e.g. if set to 1 it allows only a single reference, if set to 0 it allows unlimited references to other items. |
| Get Empty Only | Whether to restrict references to non-referenced entities only (i.e. something that has not previously been referenced by a Dynamic Link), references on items are stored on the referenced item using either Dynamic Links or Query String Fields. |
| Read Only | Whether the field is read-only by end-users (e.g. can only be set by the system through code), this would be true of Dynamic Links that are used only for storing references by other items. |
| Allow New | Whether to render hyperlinks to allow the creation of new items that will be referenced, it will also allow the specification of Query String parameters that can be read by a Query String field on the newly created item (e.g. Originating List ID and GUID, Originating Item ID and GUID and Display Text). |
| Allow Select | Whether to allow the user to select from existing items, if yes then further fields are specified. |
| Show All Items (Allow Select = True) | Whether to show an 'All Items' node in the selection tree control. |
| Direct Creating (Allow Select = True) | Whether items are automatically referenced when created through the new hyperlink. |
| Enable Close (Allow Select = True) | When the new item screen is created whether it should be automatically closed after the user selects 'OK'. |
| Created By Me (Allow Select = True) | Whether to display a shortcut node in the selection tree control that displays items created by the current user. |
| Recent (Allow Select = True) | Whether to display a shortcut node in the selection tree control that displays items created within a certain (selectable) time window, if 'Created By Me' is selected that an additional shortcut node is created for 'Created Recently By Me'. |
| Sort Items | Whether to display the items in Query Order or to sort Alphabetically. |
| From Parent | Whether new items should be created in a folder that has the same name as the parent item. This allows permissions to be specified on the folder level and for users to create new items |

TABLE 1-continued

| Property | Description |
|---|---|
| | that in effect mimic the folder structure of the referencing item (parent). |
| Specify List and Folder | Whether the user is able to specify the list and/or folder in which items will be created. |
| Auto-Link | Whether Dynamic Link will automatically create a reference to items that match the specified conditions and filters, includes an options on whether to link on load or on insert. |
| Archive References | Whether Dynamic Link will permanently delete or merely 'archive' references that are made and subsequently deleted. |
| Referencing Set | An identifier to allow Dynamic Link fields to automatically create bi-directional links between themselves. |
| Filters | See 'Filters'. One or more filters can be set to restrict the items to which Dynamic Link may create a reference. |
| Set Permissions | See 'Permissions'. |

Also in an embodiment of the invention, filters may be used to determine the SHAREPOINT™ Content Types, Lists and folders to which Dynamic Linking will form a reference. Zero, one or more filters can be defined on a Dynamic Link field definition, the options selected determine the function of the Dynamic Link field. When defining properties for a Dynamic Link field filter, the properties listed in Table 2 may set.

TABLE 2

| Property | Description |
|---|---|
| Content Type | The SHAREPOINT (TM) API is used to query the content types available in the system and presented as a list from which a content type for the filter will be defined. The GUID for the selected content type is stored within the filter and as part of the properties for the Dynamic Link field definition. An option to allow any content type is also available (i.e. all). |
| List | The SHAREPOINT (TM) API is used to query the lists in the system that support the selected content type, this is then presented as a list from which a list for then content type will be defined. The GUID for the selected list is stored within the filter and as part of the properties for the Dynamic Link field definition. An option to allow any list is also available (i.e. all). |
| Title Set Field | The SHAREPOINT (TM) API is used to query the fields on the selected content types and/or lists, the GUID for the selected field is stored as part of the filter. The value 'Title Set' field is used to determine the Text that will be displayed when items are presented and/or selected for reference by the Dynamic Link field. |
| Link Text | This text determines the text for the 'New Item' hyperlink when a specific Content Type has been defined, it allows users to create a new item of a specific content type, if not defined the actual name of the Content Type is used instead. |
| Query String | This text defines a portion of the CAML query that is used to regulate the items that a returned when referencing an item within the Dynamic Link field. This is combined with 'Recent', 'Created By Me' and other optional properties on the Dynamic Link to determine items that should be presented for reference. |

Also in an embodiment of the invention, permissions properties on a Dynamic Link field definition may be used to determine the permissions to any items that are created from the Dynamic Link. The SHAREPOINT™ API is used to query the permissions levels, groups and users in the system, these options can be selected in combination to define the permissions that will be set onto an item that is created through the Dynamic Link field. The permissions for the user creating the item at the time can also be set.

For example, <Site Owners>→Full Control, <Current User>→Contributor, <Site Members>→Read would remove all permissions on the item created and assign all members of the <Site Owners> user group Full Control on the item, the <Current User> would have Contributor permission and <Site Members> permissions to Read the item. The permissions can override any inheritable permissions on the item.

Regarding the Dynamic Link Field Control—this field functions in conjunction with the inventive Dynamic Form, which extends the SHAREPOINT™ forms to also include support for AJAX and 'Standard RADS Properties' to control visibility and transmittal of fields values between fields. These extensions provide a framework in which the Dynamic Link Field Control can independently perform post-backs and communicate with the server without requiring full post-backs of the entire form, this gives the Dynamic Link field the appearance of operating Dynamically within the browser, in a form not enabled form this dynamic support the Dynamic Link Field requires post-back events of the entire form. The Dynamic Link field interprets the Field Definition information to function appropriately, it renders within a structure that separates overall control functions from the referencing functions, such as an HTML Table Control.

In an embodiment of the present invention, overall control functions include Insert, Cancel and Refresh. The Insert function allows a new reference to be created as part of the field control, Cancel will cancel the current operation (and appears only when an operation is in progress) and Refresh will re-query the underlying system using the SHAREPOINT™ API's to obtain the most up-to-date information.

In order to facilitate the selection of items that match the field definition, the Field Control uses the SHAREPOINT™ API to perform queries and other functions to find matching results. Not all queries are required to be executed in advance, as a sequencing mechanism is used to allow specific navigation through the options for users if multiple options are available.

An example sequencing mechanism is the use of a Standard Web Tree Control—this could be used for sequencing where each node level within the tree control represents the next sequenced step in identifying potential references points. Other mechanisms could alternatively be used, including sequential presentation of list controls.

In an embodiment of the present invention, the Sequencing mechanism is dependent on the options selected within the field definition. For example, if a single content type within a single list with a single selection criteria is defined within the field definition and direct creation is enabled, then the sequencing mechanism may shortcut the display process and either immediately return matching results, thereby navigating all the node levels of a tree control, or, if not, items being present immediately present an option for the creation of a new item. If multiple content types, list and selection criteria were defined, then the sequencing mechanism may choose to first present to the user choices on selecting the sequencing path, and thereby reducing the traffic and code executed to find results on the server. For example, the user may first pick content type, then be presented with all the lists for that content type. After picking the list it would then display the next listing in the sequence which could be the folder or a specific set of query criteria including options such as "Created By Me" or "Recent."

Determining the results of each sequencing step involves interpreting the field definition values and executing SHAREPOINT™ API's to return result sets. Between each step, a post-back mechanism may be used to transmit the user action from the client (browser) to the server.

When an item is selected against which a reference will be recorded in the field it is presented to the client with a hyperlink to allow direct navigation to the referenced item as well as control options to allow the user to modify and/or remove the reference, such as refresh to the latest version.

According to an embodiment of the present invention, the Dynamic Link Field uses SHAREPOINT™ MultiColumn Field Value to store information about references, although other similar field value storage mechanisms could be used. The initial columns, i.e., header columns, within the MultiColumn Field Value store information about the number of references, version and the number of columns of data used per entry. This mechanism future proofs data stored within the Field Value as the number of columns per storage entry can then grow over time and backwards compatibility with older data can be maintained by simply reading the version information from the initial header columns. An indicator field within the header can be used to specify additional header type information. Per data row entry, i.e., per reference, information is then stored about the item being referenced. This information includes about the item including its "Title Set" field value, GUID, ID, Version Number, List-GUID for the list from which it was referenced, List Name, Content Type Name and Content Type GUID, the Identifier for the user that made the reference and the date/time of the reference, in addition to other information which can also be stored per data entry row.

The per data entry row information may then be used when rendering views of the references, such as Dynamic Rendering Text and/or Hyperlinks to allow view and/or edit of the referenced item. It also allows the field definition to be changed over time without impacting past references as all the information required to resolve a reference is permanently stored. If a data entry row is permanently deleted then all information for the data entry row is removed. If "Archived," then a flag is simply enabled to hide the reference from typical end-users that are viewing the Dynamic Link field. Administrators may be presented with options that allow them to restore these Archived references.

Also in an exemplary embodiment of the invention, bi-directional references are maintained by the destination utilizing either the RADS Query String Field or its own Dynamic Link Field. A exemplary RADS Query String Field operates simply by being able to store a read-only reference to a single item based on information passed on the query string. When a new item is created from a Dynamic Link Field, additional information about the item, including its identifiers and list, is passed on the query string. This allows the query string to resolve itself to point back to the item. Once created the Query String Field can subsequently ignore information on the query string and simply hold a permanent reference back to the originating item from which it was created.

A Dynamic Link Field on an exemplary item created from another Dynamic Link will create a reference back to the item from which it was created, similarly to Query String Fields. It does this by reading the information on the query string, including the "Referencing Set" identifier—which allows multiple Dynamic Link Fields to exist on an item without them all trying to form a reference by only linking if it has a matching referencing set identifier. The Dynamic Link Field control also registers for the "Item Created" Event in SHAREPOINT™ to allow the reference to be automatically created when an item is created with a Query String Field that points back to the item currently being edited. By hooking into this event a user can create an item from a Dynamic Link, which brings up a new window into which the user can specify details for the new item. If the item is then created, the item window in the background can then refresh and automatically display the reference to the newly created item.

In an embodiment of the invention, when an item already exists with an appropriately configured Dynamic Link Field for references that is subsequently referenced from another Dynamic Link Field, the "On Save" Event provides the hooking mechanism whereby the Dynamic Field Control on one item will, through code, alter the Dynamic Link references of the item referred to ensure that appropriate bi-directional links are maintained.

Also in an embodiment of the invention, when references to an item an removed within a Dynamic Link Field the "On Save" Event provides the mechanism to remove the reference from the previously referred to item, if it is appropriately configured with a Dynamic Link Field.

A partial listing of source code used in an exemplary embodiment of the invention is attached herein as Attachment A. It is understood and envisioned that the present invention can be practiced with alternative enabling code, and with variations from this sample code, without departing from the spirit and scope of the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A data management system comprising extensions to a software collaboration product, the system comprising:
   a computer processor;
   computer memory communicatively coupled to the computer processor and having a plurality of lists stored therein, each list of the plurality of lists identifying data items associated with at least one respective content type of a plurality of different content types; and
   at least one Input/Output ("I/O") device communicatively coupled to the computer processor and computer memory;
   wherein the computer processor and memory implement at least one application software collaboration product process that uses a sequencing mechanism:
      allowing a user to navigate data items of the software collaboration product which are identified in the plurality of lists; and dynamically creating at least one link between a first data item of a first content type and a second data item of a second content type different from the first content type regardless as to which ones of the plurality of lists the first and second data items are identified, in response to a user-software interaction for selecting the second content type; and maintaining bi-directional data references between the first data item and the second data item, wherein one bi-directional data reference is created by performing the steps of:

passing an identifier of the first data item and respective list to a query string, to allow the query string to resolve itself to point back to the first data item;

holding a permanent reference back to the first data item, in order to ignore information in a subsequent query string; and wherein multiple bi-directional data references are created by performing the steps of:

reading a reference set identifier in a query string, the reference set identifier to link multiple data items;

registering to allow a reference to be created automatically when an item is created with a query string that points back to the reference; and refreshing a display of the reference.

2. The data management system according to claim 1, wherein the sequencing mechanism further limits which ones of the plurality of lists that can be selected to those that contain the second content type, and allows the users to elect to create an item of the second content type in a list selected from the plurality of lists.

3. The data management system according to claim 1, wherein the sequencing mechanism further allows the user to navigate the data items using a selection criteria.

4. The data management system according to claim 3, wherein the selection criteria comprises items created by the user.

5. The data management system according to claim 3, wherein the selection criteria comprises items that match a specific query.

6. The data management system according to claim 1, wherein the sequencing mechanism further allows a system administrator to set filters on a content type and/or a list to be referenced.

7. The data management system according to claim 1, wherein the sequencing mechanism further allows a system administrator to specify queries and other criteria for restricting the data items on a per filter basis.

8. The data management system according to claim 1, wherein the sequencing mechanism further allows a system administrator to define permissions on whether new data items can be created and to set the permissions on the new data items which have been created.

9. The data management system according to claim 1, wherein the sequencing mechanism further sends data to items that are referenced to allow them to link back to the item from which they are referenced.

10. The data management system according to claim 1, wherein the bi-directional data references are maintained by usage of a RADS Query String Field.

11. The data management system according to claim 1, wherein the bi-directional data references are maintained by usage of a Dynamic Link Field.

12. A method of extending a software collaboration product, comprising:

using, by a processor, a sequencing mechanism that allows a user to navigate data items of a software collaboration product which are identified in a plurality of lists, each list of the plurality of lists identifying data items associated with at least one respective content type of a plurality of different content types, dynamically creates at least one link between a first data item of a first content type and a second data item of a second content type different from the first content type regardless as to which ones of the plurality of lists the first and second data items are identified, in response to a user-software interaction for selecting the second content type, the link including specific dynamic link properties and associated permissions based upon a defined field type of one or more custom fields, wherein the dynamic link properties comprise one or more parameters for defining dynamic link configuration, and maintains bi-directional data references between the first data item and the second data item, wherein:

one bi-directional data reference is created by performing the steps of:

passing an identifier of the first data item and respective list to a query string, to allow the query string to resolve itself to point back to the first data item;

holding a permanent reference back to the first data item, in order to ignore information in a subsequent query string; and multiple bi-directional data references are created by performing the steps of:

reading a reference set identifier in a query string, the reference set identifier to link multiple data items;

registering to allow a reference to be created automatically when an item is created with a query string that points back to the reference; and refreshing a display of the reference.

13. The method according to claim 12, wherein the sequencing mechanism further limits which list of the plurality of lists which can be selected to those that contain the second content type, and allows the user to elect to create an item of the second content type in a specified one of the plurality of lists.

14. The method according to claim 12, wherein the sequencing mechanism further allows the user to navigate the data items using a selection criteria.

15. The method according to claim 14, wherein the selection criteria is selected from the group consisting of items created by the user, items created by the user within a specific time period, and items that match a specific query.

16. The method according to claim 12, wherein the sequencing mechanism further allows a system administrator to set filters on a content type and/or a list to be referenced.

17. The method according to claim 12, wherein the sequencing mechanism further allows a system administrator to specify queries and other criteria for restricting the data items on a per filter basis.

18. The method according to claim 12, wherein the sequencing mechanism further allows a system administrator to define permissions on whether new items can be created and to set the permissions on the new items which have been created.

19. The method according to claim 12, wherein the sequencing mechanism further sends data to items that are referenced to allow each of the items to link back to an item from which the item is referenced.

* * * * *

UNITED STATES PATENT AND TRADEMARK OFFICE
CERTIFICATE OF CORRECTION

PATENT NO.         : 9,436,774 B2                                    Page 1 of 1
APPLICATION NO.    : 12/699398
DATED              : September 6, 2016
INVENTOR(S)        : Andrew Stuart

It is certified that error appears in the above-identified patent and that said Letters Patent is hereby corrected as shown below:

In the Specification

In Column 7, Line 65, delete "Members→" and insert -- Members>→ --, therefor.

In Column 10, Line 31, delete "an item an" and insert -- an item are --, therefor.

Signed and Sealed this
Seventh Day of March, 2017

Michelle K. Lee
*Director of the United States Patent and Trademark Office*